(12) United States Patent
Hayashi

(10) Patent No.: US 7,148,894 B1
(45) Date of Patent: Dec. 12, 2006

(54) IMAGE GENERATION SYSTEM AND PROGRAM

(75) Inventor: Atsushi Hayashi, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 324 days.

(21) Appl. No.: 09/762,952

(22) PCT Filed: Jun. 2, 2000

(86) PCT No.: PCT/JP00/03589

§ 371 (c)(1),
(2), (4) Date: Mar. 12, 2001

(30) Foreign Application Priority Data

Jun. 17, 1999 (JP) ................................. 11-171312

(51) Int. Cl.
*G06T 11/00* (2006.01)

(52) U.S. Cl. ..................................................... 345/472

(58) Field of Classification Search ................. 345/473, 345/474; 463/2, 30, 42, 52
See application file for complete search history.

(56) References Cited

U.S. PATENT DOCUMENTS

| | | | | |
|---|---|---|---|---|
| 4,695,058 | A * | 9/1987 | Carter, III et al. ............... | 463/5 |
| 5,613,913 | A * | 3/1997 | Ikematsu et al. ............. | 463/52 |
| 5,738,584 | A * | 4/1998 | Ikematsu et al. ............. | 463/52 |
| 5,775,998 | A * | 7/1998 | Ikematsu et al. ............. | 463/52 |
| 6,067,096 | A * | 5/2000 | Nagle .......................... | 345/473 |
| 6,102,801 | A | 8/2000 | Sugawara | |
| 6,319,119 | B1 * | 11/2001 | Konoe et al. .................. | 463/2 |
| 6,335,731 | B1 * | 1/2002 | Yamamoto .................. | 345/420 |
| 6,336,864 | B1 * | 1/2002 | Nakanishi .................... | 463/33 |
| 6,501,477 | B1 * | 12/2002 | Mochizuki et al. ......... | 345/474 |

FOREIGN PATENT DOCUMENTS

| | | |
|---|---|---|
| JP | 2000-157729 | 6/2000 |
| WO | WO 96/36017 | 11/1996 |

OTHER PUBLICATIONS

Moore et al., Aug. 1988, Collision detection and response for computer animation, Computer Graphics, vol. 22, No. 4, pp. 289-298.*

(Continued)

*Primary Examiner*—Trinh Dinh
*Assistant Examiner*—Huedung Mancuso
(74) *Attorney, Agent, or Firm*—Oliff & Berridge, PLC

(57) ABSTRACT

An object is to provide an image generation system and program which can realize a realistic, variable and natural representation of motion with less data. When the forearm (14) of an enemy character is hit, the forearm (14) is moved through a physical simulation by a vector of hitting force FH0. At the same time, vectors of hitting force FH1 to FH4 are sequentially transmitted to the brachium (16), chest (18) and hip (20) which are parent parts for the forearm (14) while their magnitude being sequentially attenuated. These vectors of hitting force FH1 to FH4 move these parent parts to generate a motion of the object. A rotational resistance force depending on its angular velocity and a restoring force for returning the part to its default posture act on each of the parts. When the object is hit, the play of motion based on motion data is switched to the generation of motion through the physical simulation. When a given time period elapses or when the strength parameter relating to the object becomes equal to zero, the generation of motion is switched to the play of motion. On switching, a connecting motion is played or generated.

24 Claims, 16 Drawing Sheets

OTHER PUBLICATIONS

Victor B. Zordan, 2002, Motion capture-driven simulations that hi and react, ACM, pp. 89-193.*

Badler et al., Mar. 1979, Digital representations of human movement, ACM, vol. 11, pp. 1-38.*

Shao et al. A general joint component framework for realistic articulation in human characteristic, ACM, 2003, pp. 11-18.*

Centipede Game, AtariCorp, 1981.*

Centipede Game, Atari Corp. 1980, 1981.*

* cited by examiner $|FH_N| > |FH_{N+1}| > |FH_{N+2}|$

F I G. 8
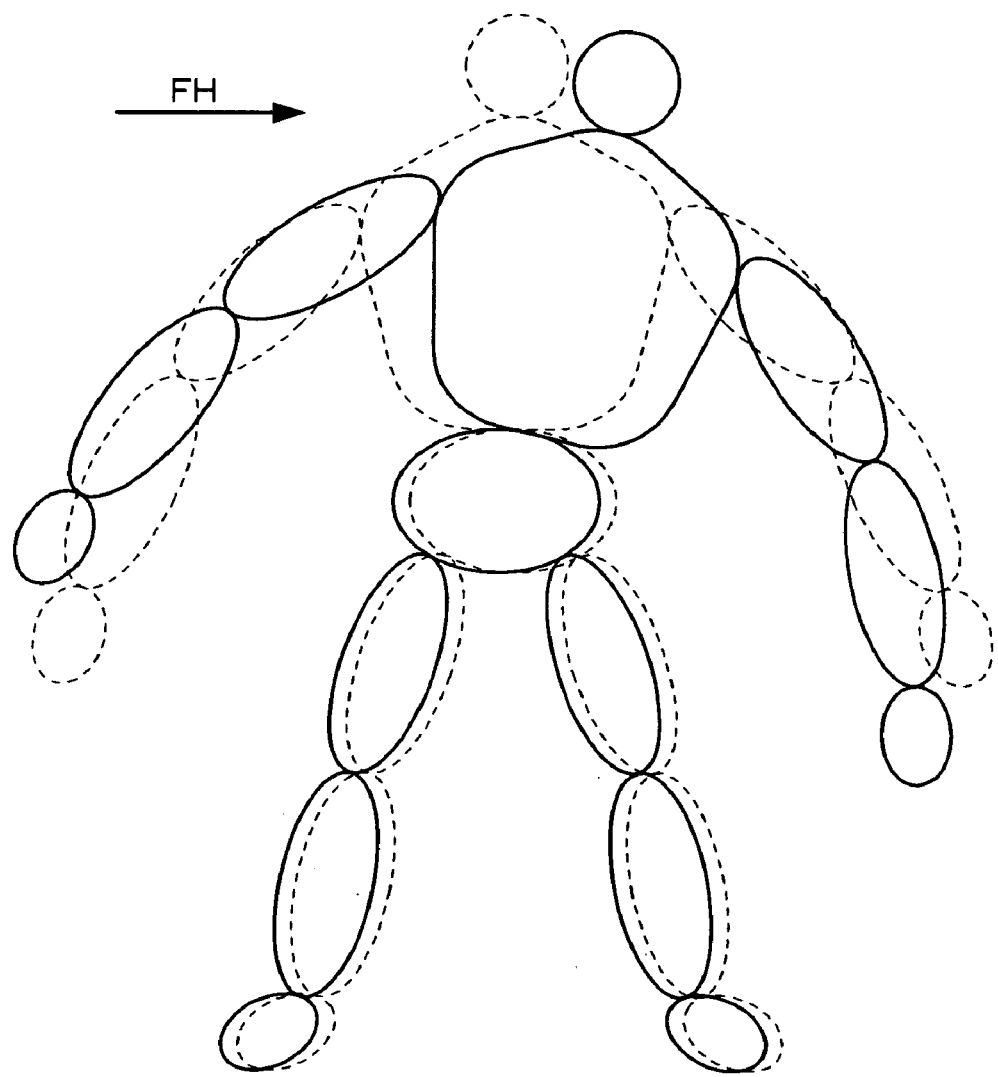

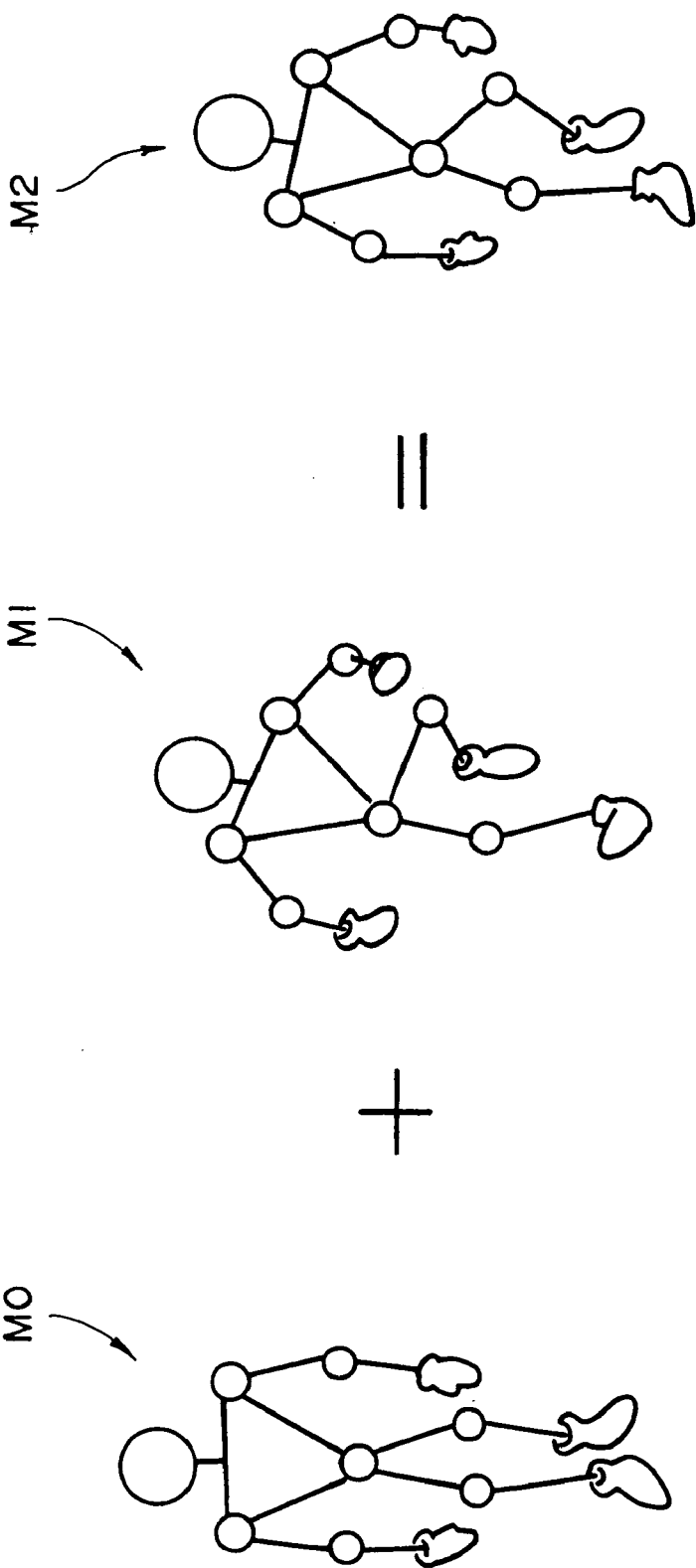

IMAGE GENERATION SYSTEM AND PROGRAM

This application is the National Phase International Application PCT/JP00/03589, filed Jun. 2, 2000.

TECHNICAL FIELD

The present invention relates to an image generation system and program.

BACKGROUND OF ART

There is known an image generation system for generating an image visible from a given view point within an object space which is a virtual three-dimensional space. This image generation system is highly popular as a system which is capable of experiencing a so-called virtual reality. If such an image generation system is used for a gun game, a player (or operator) can enjoy a three-dimensional game by using a gun-type controller (or shooting device) to shoot target objects such as enemy characters (or objects) which are displayed on a screen.

In such an image generation system, it becomes an important technical problem to generate a more realistic image for improving the virtual reality. It is thus desirable that the motion of enemy characters can more realistically be represented as well. The image generation systems of the prior art have represented the motion of enemy characters by selecting a previously provided motion data and playing (replaying) a motion based on the selected motion data.

However, such a technique of playing the motion based on the motion data had the following problems:

(1) Even if an enemy character is hit, it only performs the same behavior at all times. This makes the representation of motion monotonous.

(2) If the enemy character is further hit, the play of motion started by hitting of the first shot (bullet) will be cut off by the second shot. This makes the motion of the enemy character unnatural.

(3) In order to increase the variation of motion for the enemy character, it is required to increase the motion data correspondingly. However, the capacity of the memory for storing the motion data is finite. Thus, the increase of the motion variation is also limited.

DISCLOSURE OF INVENTION

It is therefore an object of the present invention to provide an image generation system and program which can realize a more realistic, changeful and natural representation of motion through less data.

To this end, the present invention provides an image generation system comprising: means for generating a motion of an object formed by a plurality of parts (regions, portions), by moving an Nth part through a physical simulation based on hit information when the Nth part is hit and sequentially transmitting the hit information to the N+1th, N+2th, N+3th . . . parts so that the N+1th, the N+2th, the N+3th . . . parts are sequentially moved through a physical simulation based on the transmitted hit information; and means for generating an image including an image of the object on which the motion is generated. The present invention also provides a computer-usable information storage medium which includes information (such as program or data) for realizing (or executing) the above-mentioned means. The present invention further provides a program embodied in an information storage medium or a carrier wave and including a processing routine for realizing (or executing) the means.

According to the present invention, the Nth part of the object will be moved (e.g., rotated or changed the position) through the physical simulation (including a pseudo-physical simulation) based on the hit information when the Nth part is hit. This hit information is further sequentially transmitted to the subsequent parts (N+1th, N+2th and so on) which will in turn be moved based on the transmitted hit information. When the object's motion is generated in such a manner, the object can perform different motions depending on, for example, the position of hit, the direction of hit and so on. As a result, the present invention can realize various realistic representations of motion.

In the image generation system, information storage medium and program according to the present invention, the hit information may be a force vector in the direction of hitting, and each of the parts may be moved through a rotation moment obtained by the force vector. Thus, the various realistic representations of motion can be realized through a simplified process in which the force vector is only used to move each of the parts or only transmitted to each of the parts.

In the image generation system, information storage medium and program according to the present invention, the magnitude of the force vector may be sequentially attenuated while being transmitted to each of the parts. Thus, the closer to the position of hit the part is, the greater the part moves. That can realize variety of realistic motions by simple processing.

In the image generation system, information storage medium and program according to the present invention, a rotational resistance force may act on each of the parts depending on the angular velocity of each of the parts. Thus, it can be prevented that the generated motion will be made unnatural if the angular velocity in each of the object's parts becomes too large.

In the image generation system, information storage medium and program according to the present invention, a restoring force for returning an object back to a given posture may act on each of the parts. Thus, an object can be represented which will not fairly be fallen, for example, even if it is continuously hit.

In the image generation system, information storage medium and program according to the present invention, processing may be switched from a play (replay) of the object's motion based on motion data to a generation of the object's motion through the physical simulation when the object is hit.

In the image generation system, information storage medium and program according to the present invention, processing may be switched from a generation of the object's motion through the physical simulation to a play of the object's motion based on motion data when a given condition is satisfied.

The present invention further provides an image generation system comprising: means for playing a motion of an object formed by a plurality of parts based on motion data; means for generating the motion of the object through a physical simulation; and means for switching processing from a play of the object's motion based on motion data to a generation of the object's motion through a physical simulation when the object is hit. The present invention also provides a computer-usable information storage medium which includes information (such as program or data) for realizing (or executing) the above-mentioned means. The present invention further provides a program embodied in an information storage medium or a carrier wave and including a processing routine for realizing (or executing) the means.

According to the present invention, for example, the object may be moved through motion play before it is hit. After the object has been hit, the object may be moved through motion generation. Before the object is hit, therefore, the object's movement can easily be realized using the play of motion, rather than the generation of motion which would be difficult to realize the object's motion. On the other hand, after the object has been hit, the variable movement of object can be realized with less data through the generation of motion, rather than the play of motion which would require more data.

The present invention further provides an image generation system comprising: means for playing a motion of an object formed by a plurality of parts based on motion data; means for generating the motion of the object through a physical simulation; and means for switching processing from a generation of the object's motion through a physical simulation to a play of the object's motion based on the motion data when a given condition is satisfied. The present invention also provides a computer-usable information storage medium which includes information (such as program or data) for realizing (or executing) the above-mentioned means. The present invention further provides a program embodied in an information storage medium or a carrier wave and including a processing routine for realizing (or executing) the means.

According to the present invention, the object may be moved through the generation of motion before a given condition is satisfied (established). When the given condition is satisfied, the object may be moved through the play of motion. Thus, even when there occurs an event in which the motion of the object hardly realized through the generation of motion is required, it can easily be dealt with.

In the image generation system, information storage medium and program according to the present invention, processing may be switched from the generation of the object's motion through the physical simulation to the play of the object's motion based on the motion data, in at least one of cases where a given time period has elapsed after the object has been hit and where a parameter relating to the object reaches a given value. The "given condition" herein is not limited to a condition in which a given time period has elapsed or a condition in which the parameter reaches a given value.

In the image generation system, information storage medium and program according to the present invention, the object may be caused to perform a connecting motion which connects a motion generated by the physical simulation with a motion played based on the motion data. Thus, the motion can smoothly and naturally be changed in switching between the generation and play of motion.

BRIEF DESCRIPTION OF DRAWINGS

FIG. 8 illustrates a technique of returning the enemy character back to its default posture.

FIG. 11 illustrates an interpolation of motion.

BEST MODE FOR CARRYING OUT THE INVENTION

A preferred embodiment of the present invention will now be described with reference to the accompanying drawings. Although the preferred embodiment described herein is in the form of a gun (or shooting) game using a gun-type controller, it is to be understood that the present invention is not limited to such a form, but may equally be applied to any of various other forms.

1. Arrangement

Figure 1:
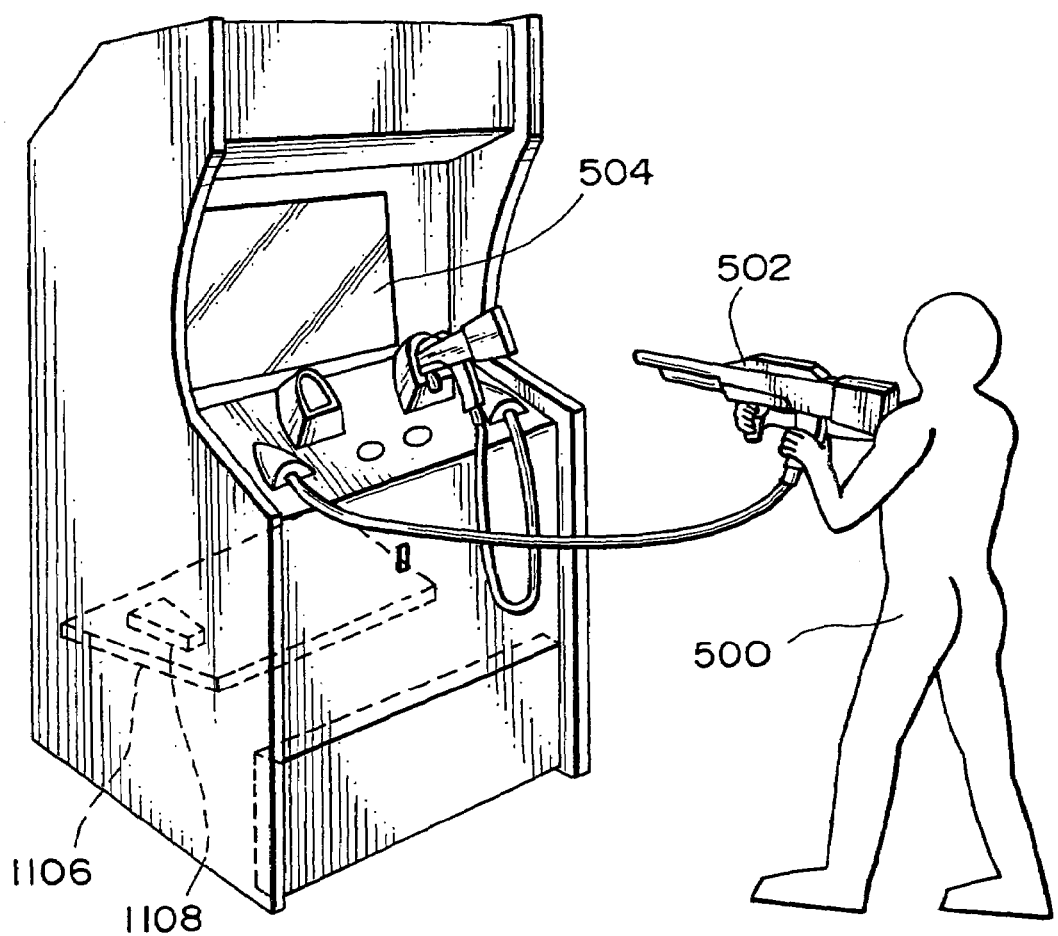
FIG. 1 illustrates one embodiment of the present invention which is applied to an arcade game system.

FIG. 1 illustrates one embodiment of the present invention which is applied to an arcade game system.

A player 500 first holds a gun-type controller 502 (which is a shooting device in a broad sense) which is formed in the similitude of a real machine gun. The player 500 can enjoy the gun game by shooting target objects including enemy characters (which are objects in a broad sense) which are displayed on a screen 504.

Particularly, the gun-type controller 502 in this embodiment is designed to continuously expel virtual shots (bullets) at high speed when the controller 502 is triggered. Thus, the player can feel a virtual reality as if he or she really shoots the real machine gun.

The shot hitting position (or bullet reaching position) may be detected by a photosensor in the gun-type controller 502 for sensing a scan ray on the screen or by a CCD camera or the like which can sense a light (or laser beam) emitted from the gun-type controller 502.

Figure 2:
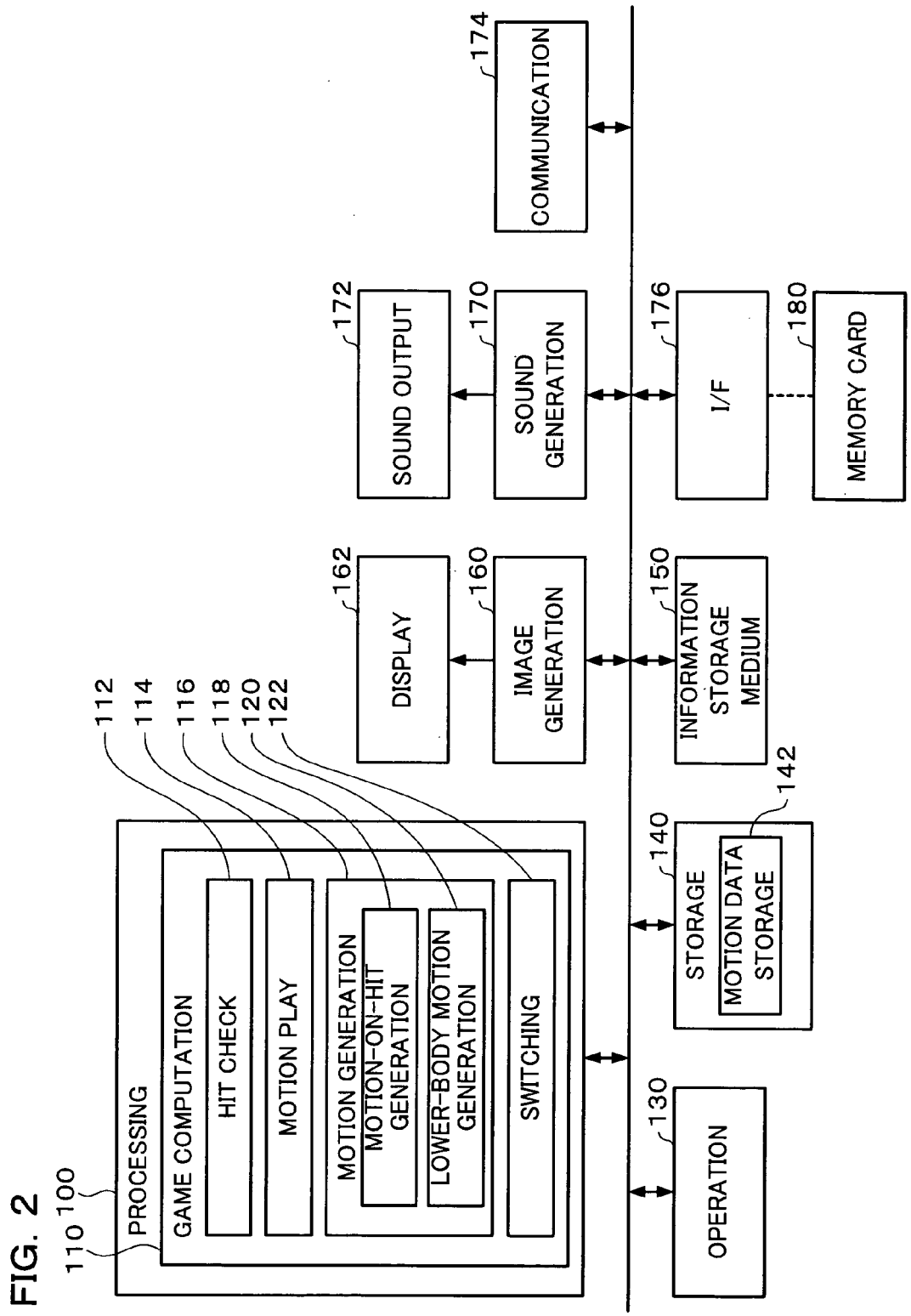
FIG. 2 is a block diagram of an image generation system constructed in accordance with the present invention.

FIG. 2 is a block diagram of one embodiment of the present invention. In this figure, this embodiment may essentially include at least a processing section 100 (or a set of the processing section 100 and a storage section 140 or a set of the processing section 100, the storage section 140 and an information storage medium 150). Each of the other blocks (e.g., an operation section 130, an image generation section 160, a display section 162, a sound generation section 170, a sound output section 172, a communication section 174, an I/F section 176, a memory card 180 and so on) may take any component.

The processing section 100 is designed to perform various processings for control of the entire system, commands to the respective blocks in the system, game computation and so on. The function thereof may be realized through any suitable hardware means such as CPU (CISC type, RISC type), DSP or ASIC (or gate array or the like) or a given program (or game program).

The operation section 130 is used to input operational data from the player and the function thereof may be realized through any hardware means such as the gun-type controller 502 of FIG. 1, levers, and buttons.

The storage section 140 provides a working area for the processing section 100, image generation section 160, sound generation section 170, communication section 174, I/F section 176 and others. The function thereof may be realized by any suitable hardware means such as RAM or the like.

The information storage medium (which may be a computer utilization storage medium) 150 is designed to store information including programs, data and others. The function thereof may be realized through any suitable hardware means such as optical memory disk (CD or DVD), magneto-optical disk (MO), magnetic disk, hard disk, magnetic tape, semiconductor memory (ROM) or the like. The processing section 100 performs various processings in the present invention (or this embodiment) based on the information that has been stored in this information storage medium 150. In other words, the information storage medium 150 stores various pieces of information (or programs and data) for realizing (or executing) the means of the present invention (or this embodiment) which is particularly represented by the block included in the processing section 100.

Part or the whole of the information stored in the information storage medium 150 will be transferred to the storage section 140 when the system is initially powered on. The information stored in the information storage medium 150 may contain at least one of program code set for processing the present invention, image information, sound information, shape information of objects to be displayed, table data, list data, player information, command information for the processings in the present invention, information for performing the processings according to the commands and so on.

The image generation section 160 is designed to generate and output various images toward the display section 162 according to instructions from the processing section 100. The function thereof may be realized through any suitable hardware means such as image generation ASIC, CPU or DSP or according to a given program (or image generation program) or based on image information.

The sound generation section 170 is designed to generate and output various sounds toward the sound output section 172 according to instructions from the processing section 100. The function thereof may be realized through any suitable hardware means such as sound generation ASIC, CPU or DSP or according to a given program (or sound generation program) or based on sound information (waveform data and the like).

The communication section 174 is designed to perform various controls for communication between the game system and any external device (e.g., host device or other image generation system). The function thereof may be realized through any suitable hardware means such as communication ASIC or CPU or according to a given program (or communication program).

Information for realizing the processings in the present invention (or this embodiment) may be delivered from an information storage medium included in a host device (or server) to the information storage medium 150 through a network and the communication section 174. The use of such an information storage medium in the hose device (or server) falls in the scope of the invention.

Part or the whole of the function in the processing section 100 may be realized through the function of the image generation section 160, sound generation section 170 or communication section 174. Alternatively, part or the whole of the function in the image generation section 160, sound generation section 170 or communication section 174 may be realized through the function of the processing section 100.

The I/F section 176 serves as an interface for information interchange between the game system and a memory card (or a portable information storage device including a portable game machine in a broad sense) 180 according to instructions from the processing section 100. The function thereof may be realized through a slot into which the memory card is inserted, a data write/read controller IC or the like. If the information interchange between the game system and the memory card 180 is to be realized in a wireless manner (e.g., through infra-red communication), the function of the I/F section 176 may be realized through any suitable hardware means such as semiconductor laser, infra-red sensor or the like.

The processing section 100 further comprises a game computation section 110.

The game computation section 110 is designed to perform various processes such as coin (or charge) reception, setting of various modes, game proceeding, setting of scene selection, determination of the position and rotation angle (about X-, Y- or Z-axis) of an object, determination of the view point and visual line (direction), regeneration (or generation) of the motion, arrangement of the object within the object space, hit checking, computation of the game results (or scores), processing for causing a plurality of players to play in a common game space, various game computations including game-over and other processes, based on operational data from the operation section 130 and according to the data and game program from the memory card 180.

The game computation section 110 comprises a hit check section 112, a motion play section 114, a motion generation section 116 and a switching section 122.

The hit check section 112 is designed to perform a hit check process for checking whether or not a virtual shot emitted by the player through the gun-type controller hits an object. In order to reduce the processing load, it is desirable to perform the hit check process using a simplified object which is obtained by simplifying the shape of the object.

The motion play section 114 is designed to play (replay) the motion of an object (enemy character or the like) based on motion data which have been stored in a motion data storage section 142. More particularly, the motion data storage section 142 has stored the motion data including the positional and angular data for each of the parts in each of the reference motions of the object. The motion play section 114 reads this motion data and moves the parts of the object based on the motion data. Thus, the motion of the object is played (replayed).

The motion generation section 116 generates the motion of the object through a physical simulation (which is a simulation utilizing a physical calculation that may be of pseudo-type). In other words, this embodiment generates the motion of the object (enemy character or the like) when subjected to a hit or the like, in real-time through the physical simulation, rather than the play of motion based on the motion data. In doing so, the present invention can provide a variable and realistic representation of motion while minimizing the amount of data to be used, in comparison with the play of motion based on the motion data.

The motion generation section 116 includes a motion-on-hit generation section 118 and a lower-body-part motion generation section 120.

The motion-on-hit generation section 118 generates the motion of an object when it is hit. More particularly, when the Nth part of the object is hit, the motion-on-hit generation section 118 moves the Nth part through the physical simulation based on hit information (or a force vector directed in the direction of hit) while at the same time it sequentially transmits (or propagates) the hit information to the subsequent N+1th, N+2th, N+3th and other parts. At this time, the magnitude of the hit information may sequentially be attenuated on transmission, for example. The N+1th, N+2th, N+3th and other parts will be moved through the physical simulation based on the transmitted hit information. When the motion of object is generated in such a manner, the realistic motion of the object can be represented with less processing load even if the object is continuously hit.

The lower-body-part motion generation section 120 generates the motion of the lower object body using a special algorithm for realistically representing the tottering behavior of the object when hit. More particularly, the object is moved to be tumbled down about its first part (e.g., left foot) which is on the ground. A target location to which the second part (e.g., right foot) not on the ground is to be moved is then set at a position limiting the tottering behavior of the object (e.g., a position in point-symmetry with a position at which the virtual center is projected onto the ground). The second part is then moved to this target location. If the motion of the object is generated in such a manner, the motion of the object can be represented such that the object is hardly tumbled while tottering.

The switching section 122 switches the play of motion to the generation of motion, for example, when the object is hit. Alternatively, the switching section 122 performs the switching between the play of motion to the generation of motion if a given condition is satisfied (e.g., if a given time period has elapsed from hitting or if the physical strength of the object becomes zero). Thus, the motion of the object can be represented through the play of motion if it is difficult to generate the motion of the object. In a game scene in which a variable motion is required with less data, the motion of the object can be represented by the generation of motion.

The image generation system of this embodiment may be a dedicated single-player system in which only a single player can play a game or a multi-player system in which a plurality of players can play a game.

If a plurality of players play the game, the game images and sounds provided to the players may be generated by only a single terminal or by a plurality of terminals which are interconnected through a network (transmission line or communication line).

2. Features of this Embodiment

Figure 3:
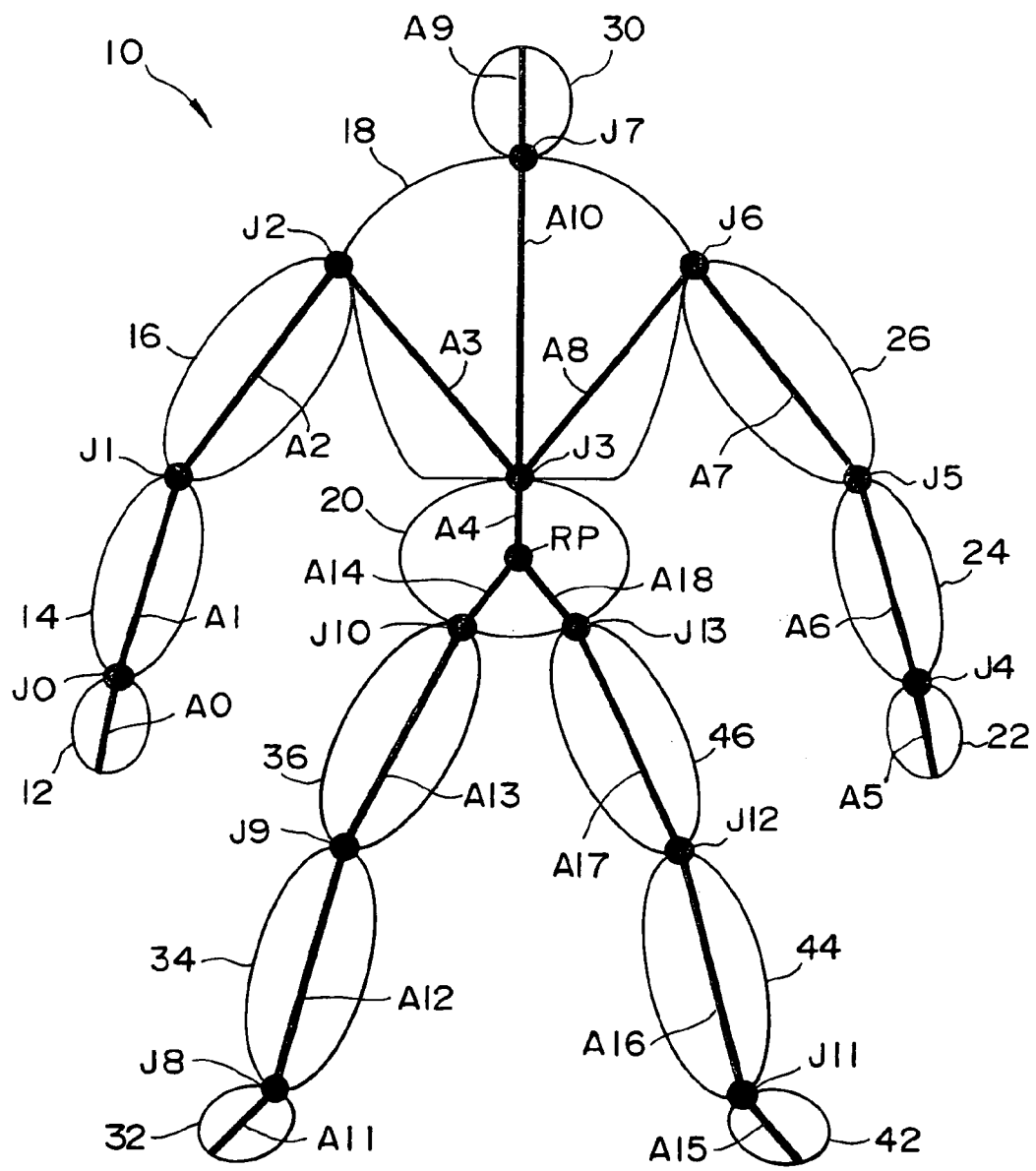
FIG. 3 illustrates an example of an enemy character (object) formed by a plurality of parts.

In this embodiment, as shown in FIG. 3, an enemy character (object) 10 is formed by a plurality of parts (which include right hand 12, right forearm 14, right brachium 16, chest 18, hip 20, left hand 22, left forearm 24, left brachium 26, head 30, right foot 32, right leg 34, right thigh 36, left foot 42, left leg 44 and left thigh 46). The positions and rotational angles (directions) of these parts (regions, portions) can be represented by the positions of joints J0 to J13 and the rotational angles of bones (arcs) A0 to A18, which joints and bones form a skeleton model. However, these bones and joints are virtual but do not represent a really displayed object.

In this embodiment, the parts forming the enemy character are placed in a parent-child structure or a hierarchy structure (in fact, the joints are placed in the parent-child structure). More particularly, the parents for the hands 12 and 22 are the forearms 14 and 24. The parents for the forearms 14 and 24 are the brachiums 16 and 26, the parent of which is the chest 18. The parent for the chest 18 is the hip 20. The parent for the head 30 is also the chest 18. The parents for the feet 32 and 42 are the legs 34 and 44, the parents of which are the thighs 36 and 46. The parent for the thighs 36 and 46 is the hip 20.

A motion data storage section has stored the positions and rotational angles of these parts (joints and bones) as motion data. For example, it is now assumed that the motion of a step is formed by reference motions MP0, MP1, MP2 . . . MPN. The position and rotational angle of each of the parts at each of these reference motions MP0, MP1, MP2 . . . MPN have previously been stored as motion data. Thus, the motion of the object can be played by sequentially reading the motion data relating to the reference motions from with time. Specifically, the position and the rotational angle of each part of the reference motion MP0 is read out then the position and the rotational angle of each part of the reference motion MP1 is read out.

The motion data stored in the motion data storage section may generally be acquired by motion capturing or prepared by a designer. The positions and rotational angles of the parts (joints and bones) are represented relative to the positions and rotational angles of the parent parts.

The first feature of this embodiment is to generate the motion of the hit enemy character (object) through the physical simulation.

Figure 4:
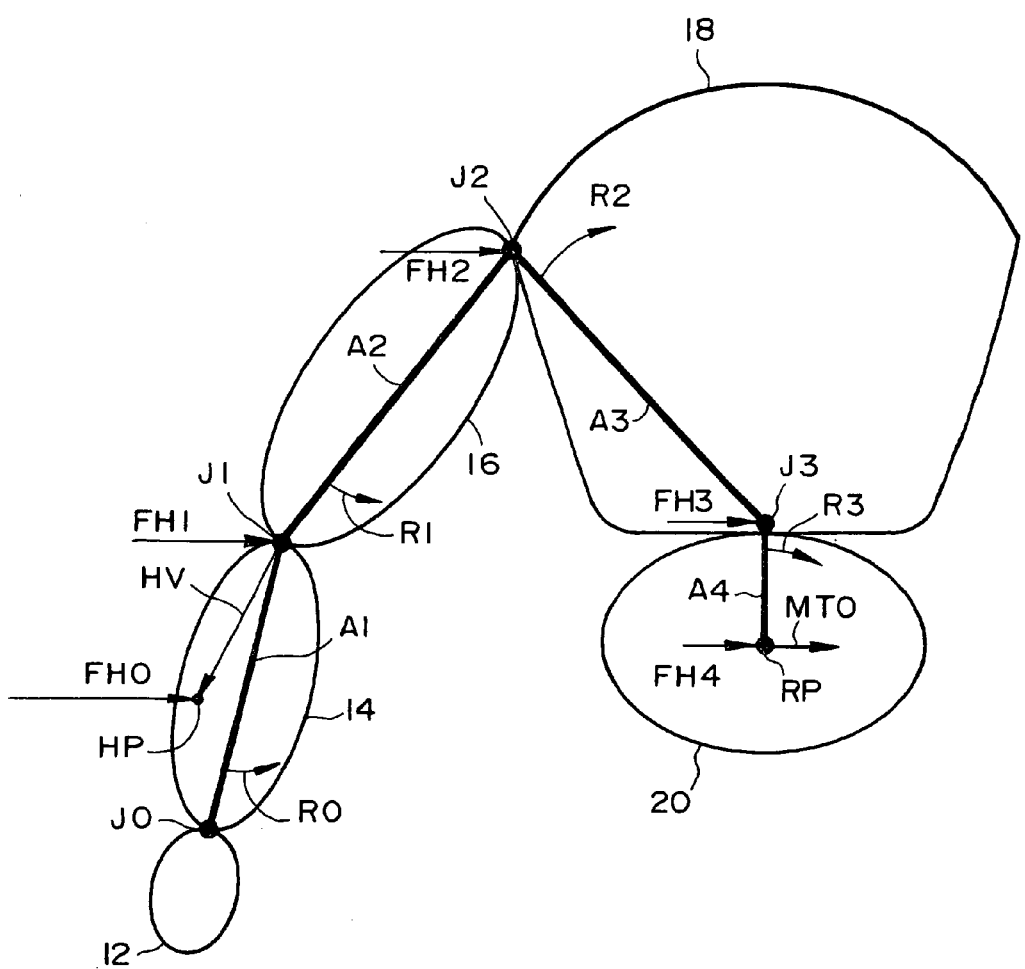
FIG. 4 illustrates a technique of generating a motion on hitting according to the present invention.
Figure 5A:
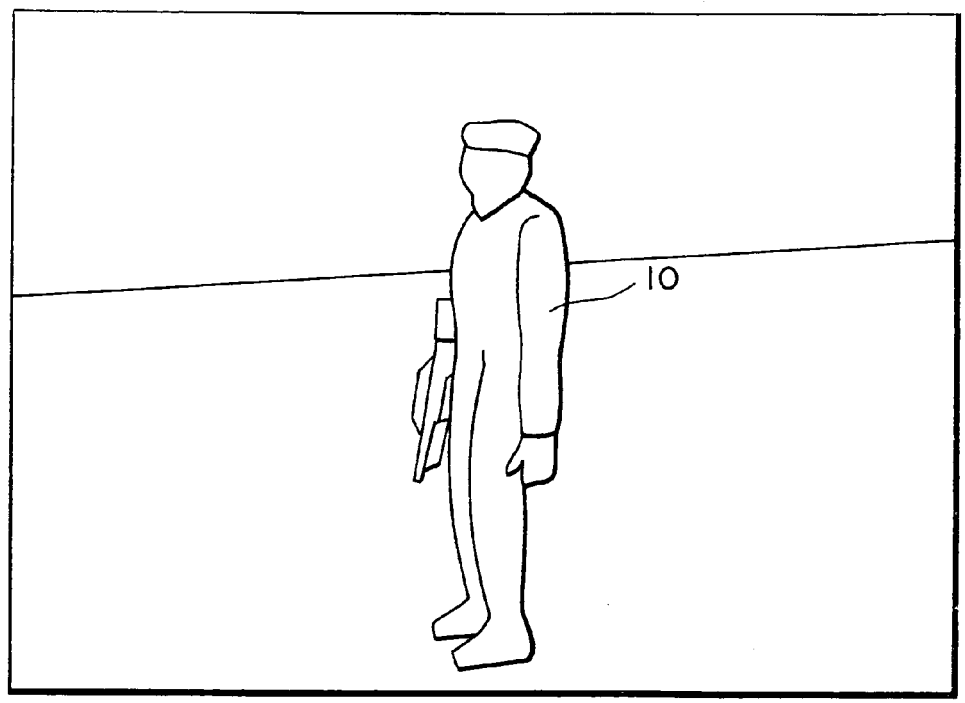
FIGS. 5A and 5B illustrate motions that may be generated according to the present invention.
Figure 5B:
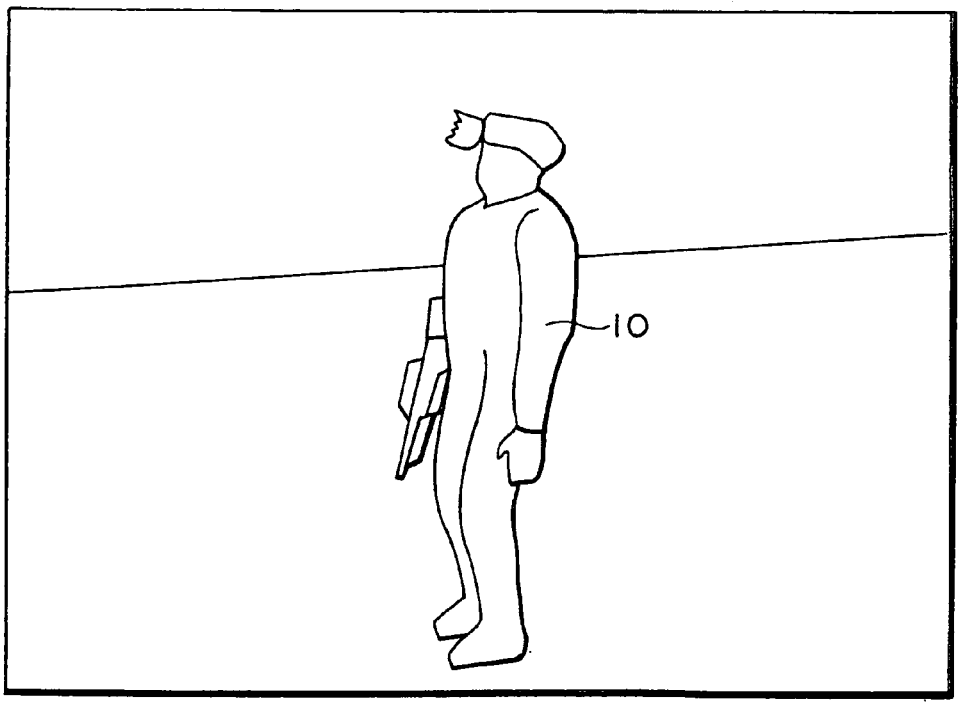
Figure 6A:
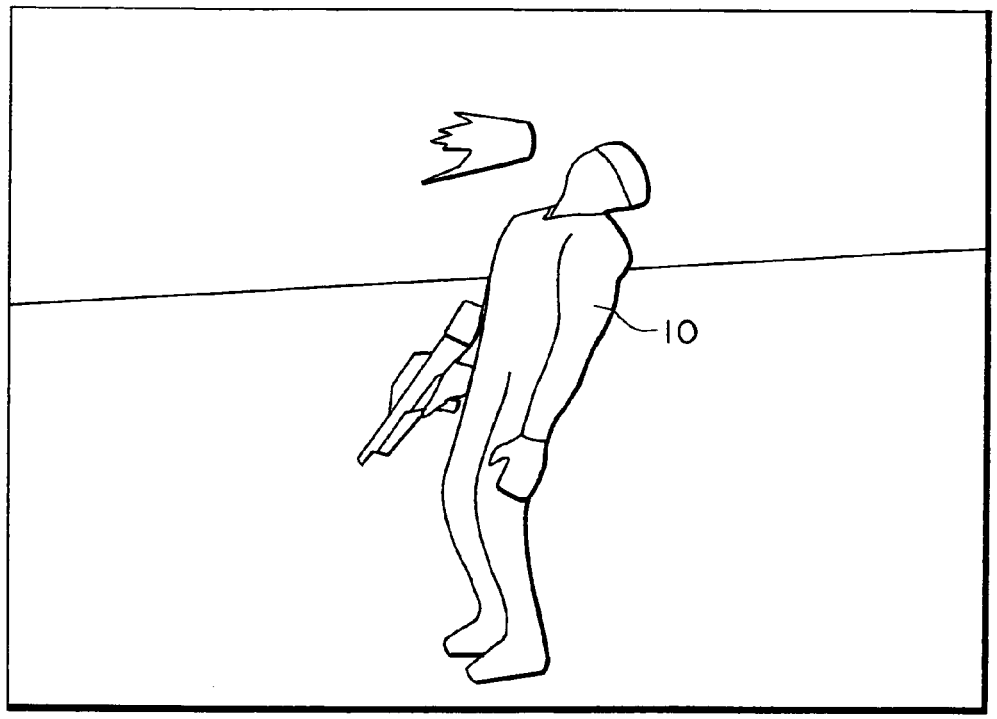
FIGS. 6A and 6B also illustrate motions that may be generated according to the present invention.
Figure 6B:
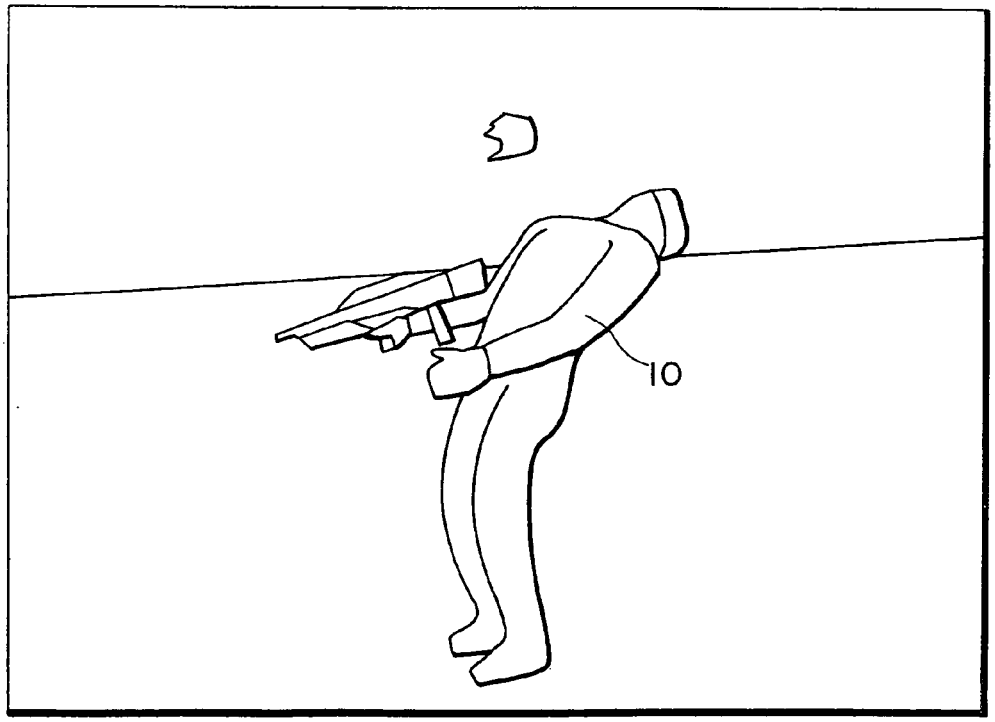

For example, when the forearm 14 of the enemy character is hit by a shot (bullet) from a player, the forearm 14 is first moved (rotated or traveled) based on a vector of hitting force FH0 (which is hit information in a broad sense), as shown in FIG. 4. This vector FH0 is further sequentially transmitted (propagated) to the brachium 16, chest 18 and hip 20 which are parent parts for the forearm 14, as FH1, FH2, FH3 and FH4. The brachium 16, chest 18 and hip 20 are then moved based on the vectors of hitting force FH1 to FH4. In this embodiment, thus, the motion of the hit enemy character is generated in real-time.

More particularly, the vector of hitting force FH0 has its direction toward the hitting direction (direction of shot trajectory) and its magnitude representing the strength of the hit. A rotation moment is determined by taking the outer product between a vector HV and the hitting force vector FH0. The HV is a rector coupling between the joint J1 and the hitting position (or bullet reaching position) HP.

The angular acceleration of the forearm 14 is then calculated from this rotation moment and the virtual mass of the forearm 14. The calculated angular acceleration is used to calculate the angular velocity in the forearm 14. Thus, the forearm 14 is rotated at this angular velocity as shown by R0.

The vector of hitting force FH0 (or hit information) is transmitted to the brachium 16 that is the parent part while its magnitude being attenuated to FH1. More particularly, FH1 acts on the joint J1 with its rotation moment rotating the brachium 16 as shown by R1.

Subsequently, FH1 is transmitted to the chest 18 and acts on the joint J2, the rotation moment thereof rotating the chest 18 as shown by R2.

FH3 is then transmitted to the hip 20 and acts on the joint J3, the rotation moment thereof rotating the hip 20 as shown by R3. FH4 is also transmitted to the hip 20 and acts on a representative point RP to move the hip 20 as shown by MT0. As the hip 20 moves in the direction of MT0, the parts other than the hip 20 will also be moved in the direction of MT0. In this case, however, the positional relationship between the hip 20 and the other parts will not be changed.

The motion generated according to this embodiment is exemplified in FIGS. 5A, 5B, 6A and 6B. This motion is generated when the head of the enemy character 10 is hit by a shot.

As can be seen from FIGS. 5A to 6B, this embodiment can realistically generate the motion of the hit enemy character 10. The generated motion depends on the position, direction and strength of hitting. Thus, variations of the motion can greatly be increased, in comparison with the play of motion based on the motion data.

More particularly, the technique of playing the motion must previously provide many types of motions depending on the positions of hitting. For example, the motion data when a forearm is hit as shown in FIG. 4 is different from that when the head is hit as shown in FIGS. 5A to 6B. Even when the same head is hit, different motion data must separately be provided relating to the front, right, back and left sides of the head which are hit.

However, the capacity of the memory for storing the motion data is finite. The technique of playing the motion is limited relating to the variations of motion.

On the contrary, this embodiment can generate a great number of various different motions depending on the position, direction and strength of hitting without providing the aforementioned motion data. For example, the reaction of the enemy character can finely be changed depending on the position of shot hitting. Thus, this embodiment can realize various and realistic representations of motion with less data.

Furthermore, the technique of playing the motion will cut off the play of motion for the hit head as shown in FIGS. 5A to 6B, for example, when the forearm is hit. This makes the behavior of the enemy character unnatural.

On the contrary, this embodiment will not cut off the motion of the hit enemy character's head even when the forearm is later hit. Thus, the motion of the hit enemy character can be smooth and continuous.

Particularly, this embodiment is designed so that the gun-type controller 502 held by the player 500 can continuously expel shots at high speed like a machine gun, as described in connection with FIG. 1. Thus, there will occur such a situation that the enemy character is continuously hit by shots. Moreover, this embodiment is designed so that the enemy character will not be erased when only a single shot hits it. Consequently, the motion of the enemy character must be represented such that it will finely change depending on the position and direction of hitting each time when a shot hits the enemy character.

The technique of playing the motion further excessively increases the necessary amount of motion data when it is to realize a motion in such a case that the character is continuously hit by shots. Thus, the technique of playing the motion cannot substantially realize the motor in such a case. On the contrary, such a technique of generation the motion as described in connection with FIG. 4 can easily realize the motion of the character continuously hit by shots.

Figure 7A:
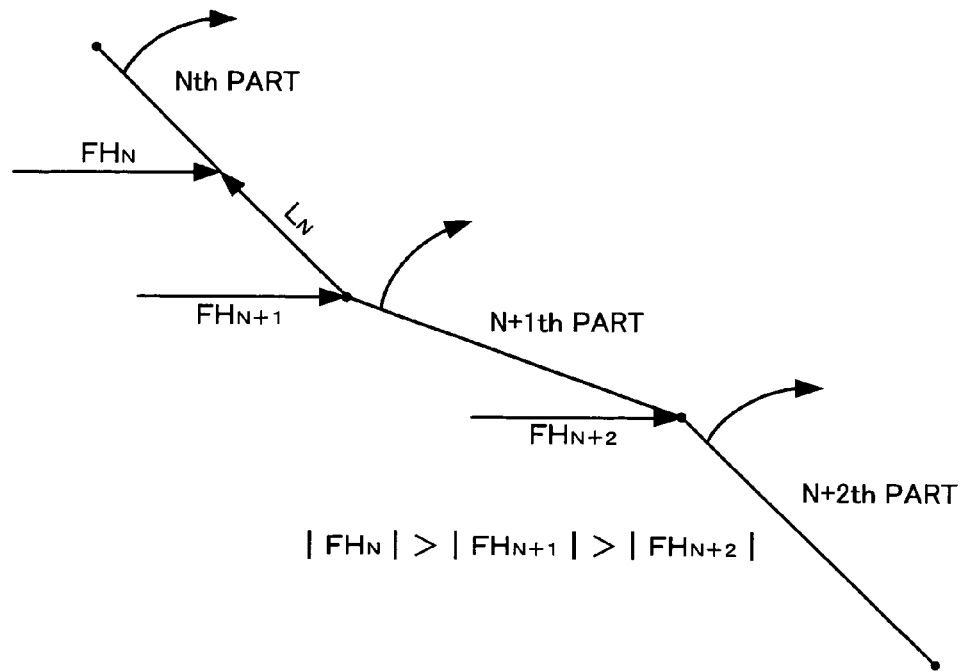
FIGS. 7A and 7B illustrate a technique of transmitting a vector of hitting force while damping it and a technique of causing a rotational resistance force on each of the parts depending on the angular velocity.

This embodiment takes the vector of hitting force as hit information for moving each of the parts. As shown in FIG. 7A, for example, a rotation moment $L_N \times F_{HN}$ may be determined from a vector of hitting force $F_{HN}$. The determined rotation moment moves (or rotates) the Nth part. Vectors of hitting force $F_{HN+1}$ and $F_{HN+2}$ are sequentially transmitted to and move the subsequent N+1th and N+2th parts. More particularly, in a frame K, $F_{HN}$ acts on the Nth part. In another frame K+1, $F_{HN+1}$ acts on the N+1th part; in still another frame K+2, $F_{HN+2}$ acts on the N+2th parts.

In such a manner, the motion of each of the enemy character's parts with impact of the vector of hitting force can realistically be represented through an easy and simple process in which the vectors of hitting force are only sequentially transmitted to the subsequent parts.

According to this embodiment, the sequential transmission of hitting force vectors to the parts is carried out while the magnitude of the transmitted hitting force vectors is sequentially attenuated (e.g., at a rate of attenuation damping factor equal to about 90%). In other words, the magnitude of the hitting force vectors is attenuated so that $|F_{HN}| > |F_{HN+1}| > |F_{HN+2}|$. Thus, a part nearer the hitting position will be more moved. A realistic change of motion more similar to the real world can be realized through a simple process in which the hitting force vectors are only reduced in magnitude.

This embodiment is also designed so that the rotational resistance depending on the angular velocity of each part acts on that part.

Figure 7B:
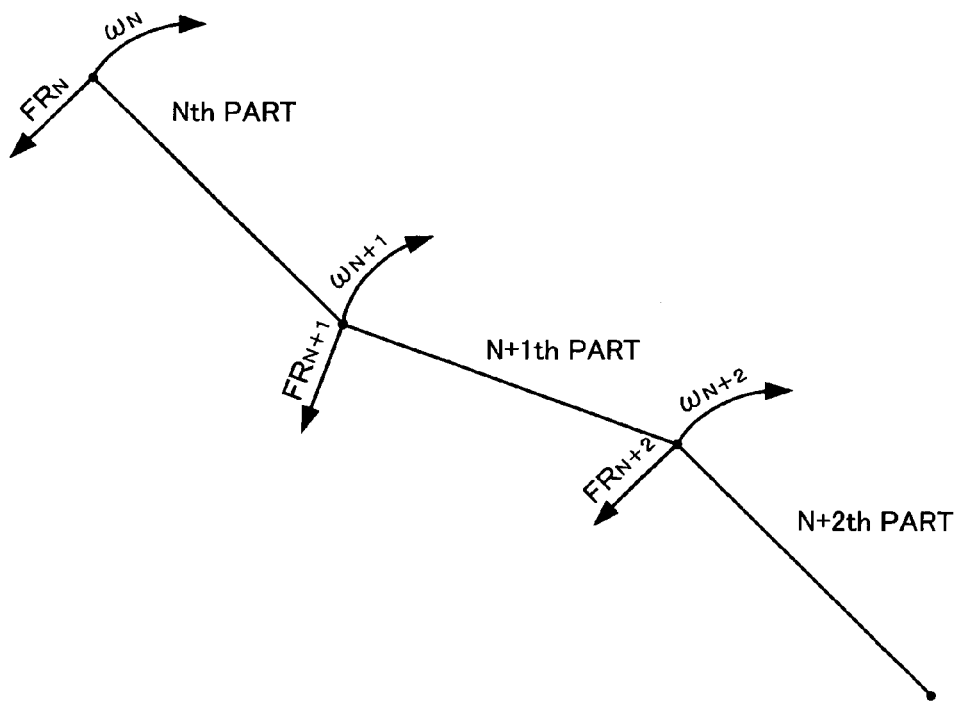

As shown in FIG. 7B, for example, the rotational resistance $F_{RN}$ may act on the Nth part depending on the angular velocity $\omega_N$ thereof. The rotational resistance $F_{RN+1}$ may act on the N+1th part depending on the angular velocity $\omega_{N+1}$ thereof in the direction opposite to the rotating direction of the N+1th part. The rotational resistance $F_{RN+2}$ may act on the N+2th part depending on the angular velocity $\omega_{N+2}$ thereof in the direction opposite to the rotating direction of the N+2th part.

By causing the rotational resistance to act in such a manner, such a situation that the angular velocity of each part will abruptly be changed to make the motion of the enemy character unnatural can effectively be prevented.

Furthermore, this embodiment causes a restoring force for returning the enemy character back to a given posture to act each of the parts.

As shown in FIG. 8, for example, the enemy character may be returned to its default posture shown by dot line after the posture of the enemy character has been changed by the vector of hitting force FH.

This can prevent such a situation that the posture of the enemy character is extremely tumbled by continuous hit of many shots. Even if the enemy character is continuously hit by shots, it can return to its default posture little by little through the restoring force each time when the enemy character is hit by a shot. Therefore, such an enemy character that will hardly be tumbled even if many shots hit it can be represented. Consequently, the present invention can provide a game in which enemy characters matching against the machine gun are represented.

The process of returning the enemy character back to its default posture can be realized by having stored default rotational angles for each parts and returning the angle of each part to one of these default angles.

The second feature of this embodiment is to switch the play (replay) of motion based on the motion data to the generation of motion through the physical simulation when the enemy character is hit.

Figure 9A:
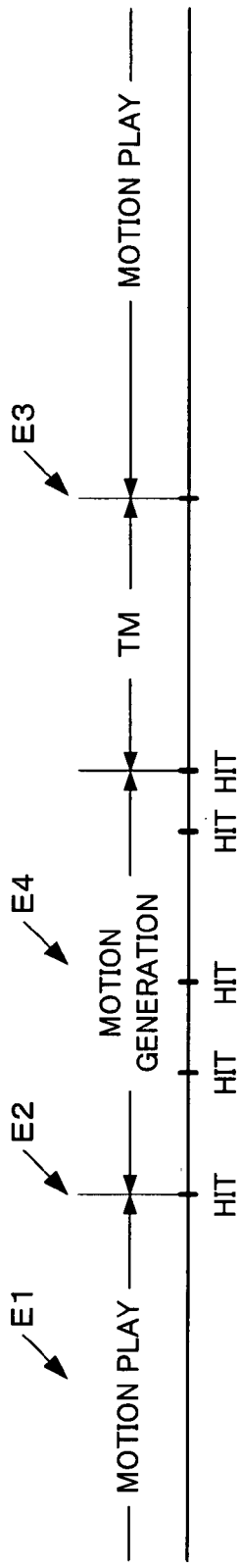
FIGS. 9A and 9B illustrate a technique of switching between the generation and play of motion.

As shown at E1 in FIG. 9A, for example, the motion of the enemy character may be represented through the play of motion before the enemy character is hit. In other words, the motion of the enemy character is represented through the play of motion based on the motion data when the enemy character moves to a given location, hides behind any matter or appears before the player.

On the other hand, when the enemy character is hit as shown at E2, the play of motion is switched to the generation of motion. In other words, for example, the motion of the hit enemy character may be represented by such a technique of generation the motion as described in connection with FIG. 4.

The game operation by the player will not very influence the motion of the enemy character before it is hit. Therefore, the motion of the enemy character can sufficiently be represented only by the play of motion based on the motion data. When the motion of the enemy character in which it hides behind any matter or appears before the player is to be realized through the generation of motion, the process becomes complicated with the processing load being increased.

On the other hand, the game operation by the player strongly influences the motion of the enemy character when it is hit. The player can shoot any enemy character in any direction. This cannot wholly be expected before starting of the game. Therefore, the motion of the enemy character must finely be changed depending on the game operation (or shooting) by the player when the enemy character is hit. It is thus desirable that the motion of the enemy character is represented by the generation of motion as shown in FIG. 4, rather than the play of motion. The motion of the hit enemy character is suitable for the generation of motion through the physical simulation, in comparison with the motion thereof when the enemy character hides behind any matter or appears before the player.

In view of the foregoing, this embodiment switches the play of motion to the generation of motion when the enemy character is hit, as shown at E2 in FIG. 9A. Thus, the enemy character can be moved through an appropriate procedure depending on the situation.

The third feature of this embodiment is to switch the generation of motion through the physical simulation to the play of motion based on the motion data when a given condition is satisfied.

As shown at E3 in FIG. 9A, for example, the generation of motion may be switched to the play of motion after a given time period TM has elapsed after hit.

In other words, when the enemy character is continuously hit by shots for a short time period as shown at E4, it will be moved through the generation of motion as described in connection with FIG. 4. Thus, the motion of the enemy character can finely and variably be represented depending on the position and direction of hitting each time when the enemy character is hit by a shot.

On the other hand, when a given time period TM elapses after the enemy character has been hit by a shot as shown by E3 of FIG. 4A, it may be considered that the continuous shooting is no longer carried out against the enemy character. In this case, therefore, the motion of the enemy character will be represented through the play of motion based on the motion data. Thus, the motion of the enemy character can be represented such that it moves to any other location or hides behind any matter after the enemy character is attacked by the player.

Figure 9B:
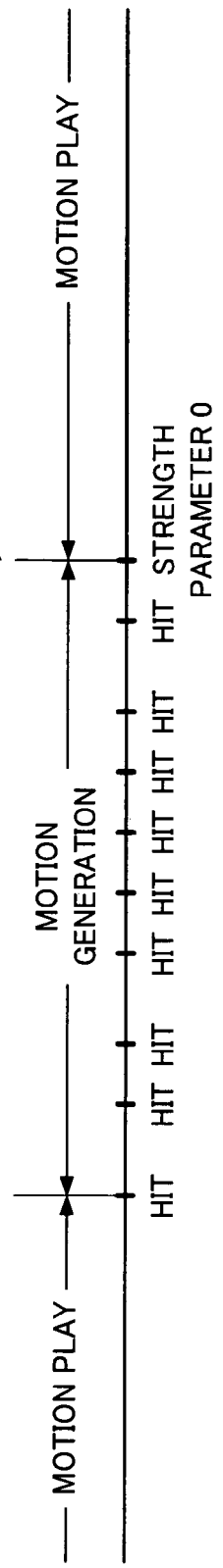

At E5 in FIG. 9B, the generation of motion is switched to the play of motion since the strength parameter of the enemy character becomes zero (or a given value). In such a case, the motion of the enemy character is played such that it is completely tumbled and disappears.

When the strength parameter becomes zero, it is reserved for the enemy character to disappear. This will not influenced by the game operation of the player. In this case, therefore, the motion of the enemy character will be represented by the play of motion, rather than the generation of motion. This can improve the stage effect of game since the enemy character can realistically be tumbled based on the previously provided motion data.

It is desirable that when the switching between the generation of motion and the play of motion is performed, a connecting motion for connecting between the motion generated through the physical simulation and the motion played based on the motion data is played (or generated).

Figure 10A:
FIGS. 10A and 10B illustrate a technique of playing (or generating) a connecting motion.

In FIG. 10A, for example, there may be a switching point F1 between the generation of motion and the play of motion. In this case, therefore, a connecting motion between the last generated motion MGM and the first played motion MP0 will be played (or generated).

Figure 10B:
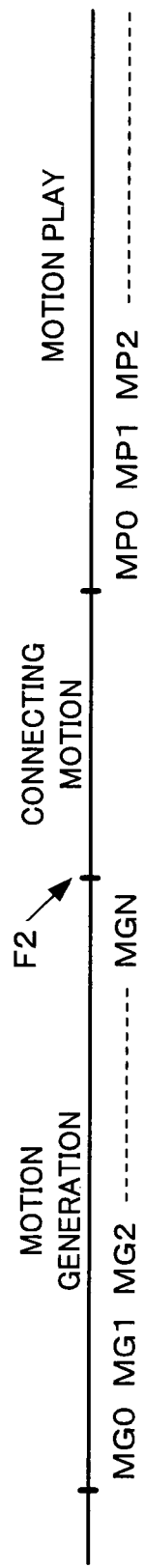

In FIG. 10B, there may be a switching point F2 between the generation of motion and the play of motion. In this case, therefore, a connecting motion between the last generated motion MGN and the first played motion MP0 will be played (or generated).

In such a manner, the motion of the enemy character can smoothly be represented even if the switching is carried out at any point in the generation of motion. Consequently, the reality and quality of the generated image can be improved.

It is further desirable that the play of the connecting motion is realized through the interpolation of motion as shown in FIG. 11. More particularly, the motions M0 and M1 are interpolated, for example, by the following formula:

$$M2 = \alpha \times M0 + (1-\alpha) \times M1$$

while the weighting factor is being changed from 0 to 1. This provides the motion M2. (Actually, the position and rotational angle are interpolated by the above formula). In this case, MGM and MGN of FIGS. 10A and 10B become M0 of FIG. 11 and MP0 becomes M1. The resulting connecting motion becomes M2.

3. Processing of this Embodiment

Details of this embodiment will now be described with reference to flowcharts shown in FIGS. 12, 13 and 14.

Figure 12:
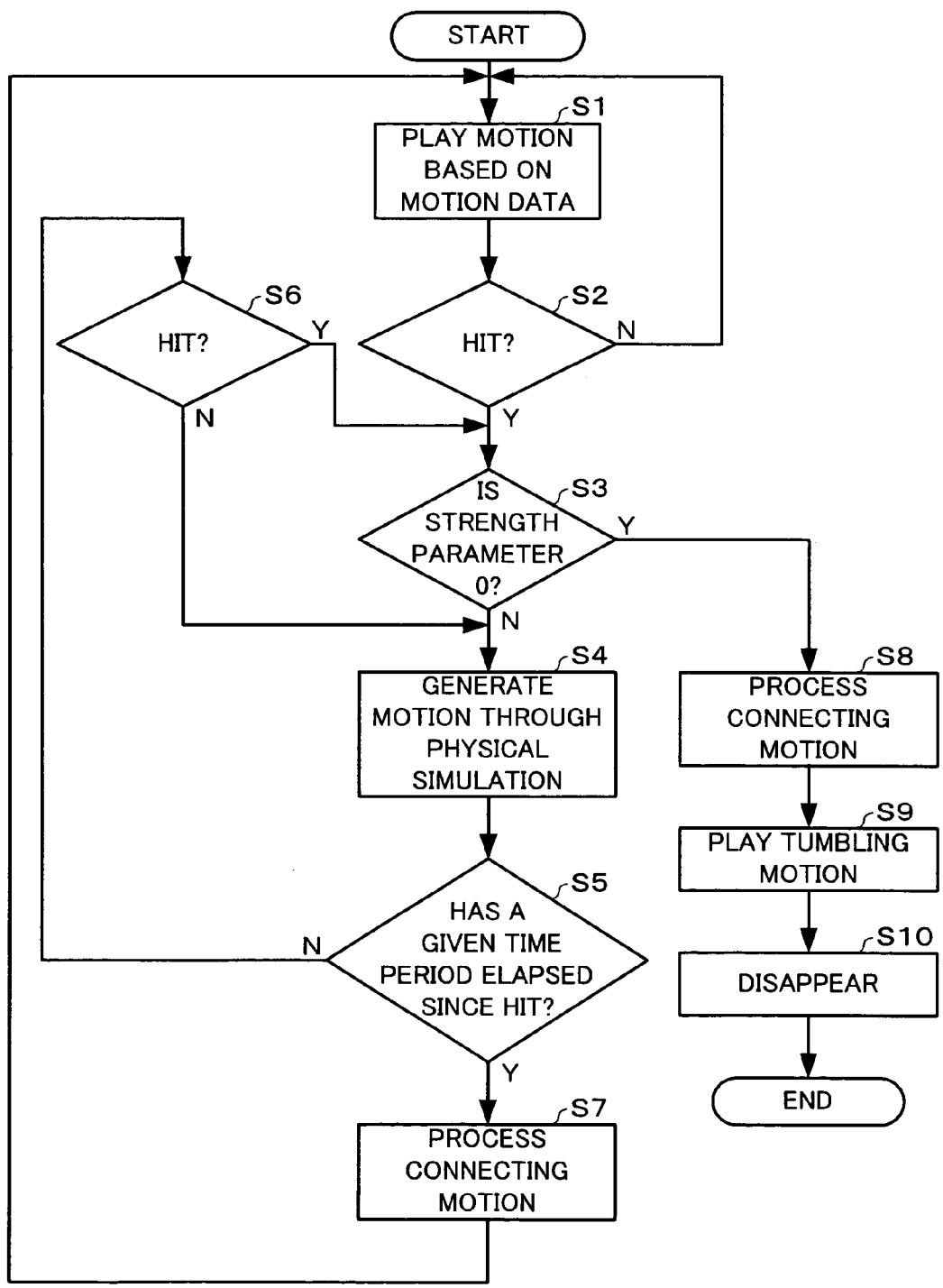
FIG. 12 is a flowchart illustrating the details of a process according to the present invention.

FIG. 12 is a flowchart relating to the switching between the play of motion and the generation of motion.

The generation of motion is first performed based on the motion data (step S1). For example, the motion of the enemy character in which it moves to a predetermined location, appears before the player or hides behind any matter may be realized through the play of motion.

It is then judged whether or not the enemy character is hit by a shot from the player (step S2). If not so, the procedure returns to the step S1 in which the play of motion is continued. If the enemy character is hit, it is then judged whether or not the strength parameter is zero (step S3). If not so, the procedure is shifted to the generation of motion through the physical simulation (step S4).

It is then judged whether or not a given time period elapses after hit (step S5). If not so, it is then judged whether or not the enemy character is hit by a shot from the player (step S6). If the enemy character is hit, it is then judged at the step S3 whether or not the strength parameter is zero. If not so, the generation of motion at the step S4 is continued. If the enemy character is not hit, the generation of motion at the step S4 is continued without performing the judgment relating to the strength parameter at the step S3.

If it is judged at the step S5 that the given time period has elapsed, a connecting motion is played (or generated) at step S7 as described in connection with FIGS. 10A and 10B. And then, the procedure is switched to the play of motion as shown at E3 in FIG. 9A.

If it is judged at the step S3 that the strength parameter is equal to zero, a connecting motion to a tumbling motion is played (or generated) (step S8). When the procedure shifts to the mode of playing the tumbling motion (step S9) as shown at E5 in FIG. 9B, the enemy character disappears (step S10).

Figure 13:
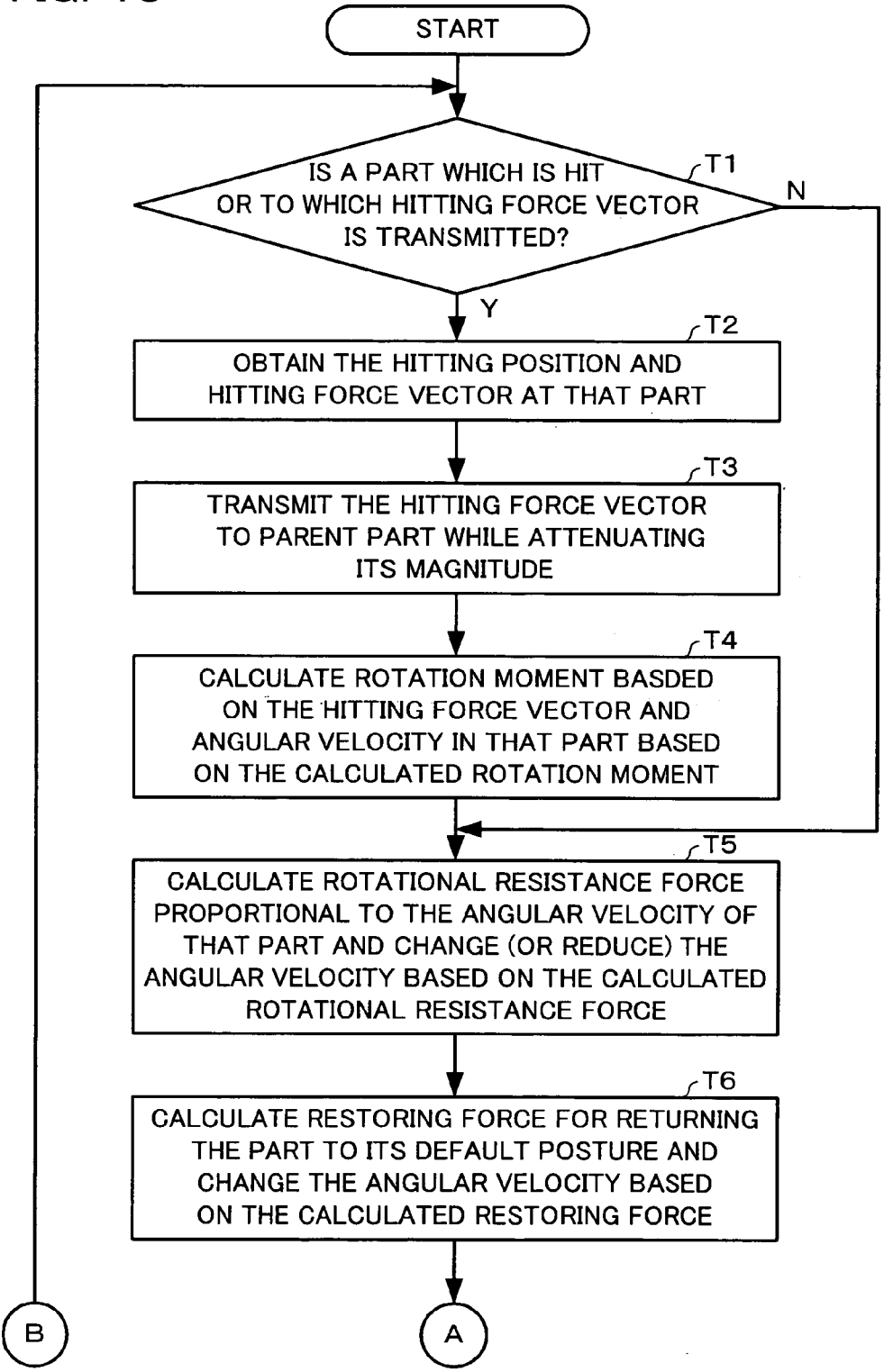
FIG. 13 is a flowchart illustrating the details of another process according to the present invention.
Figure 14:
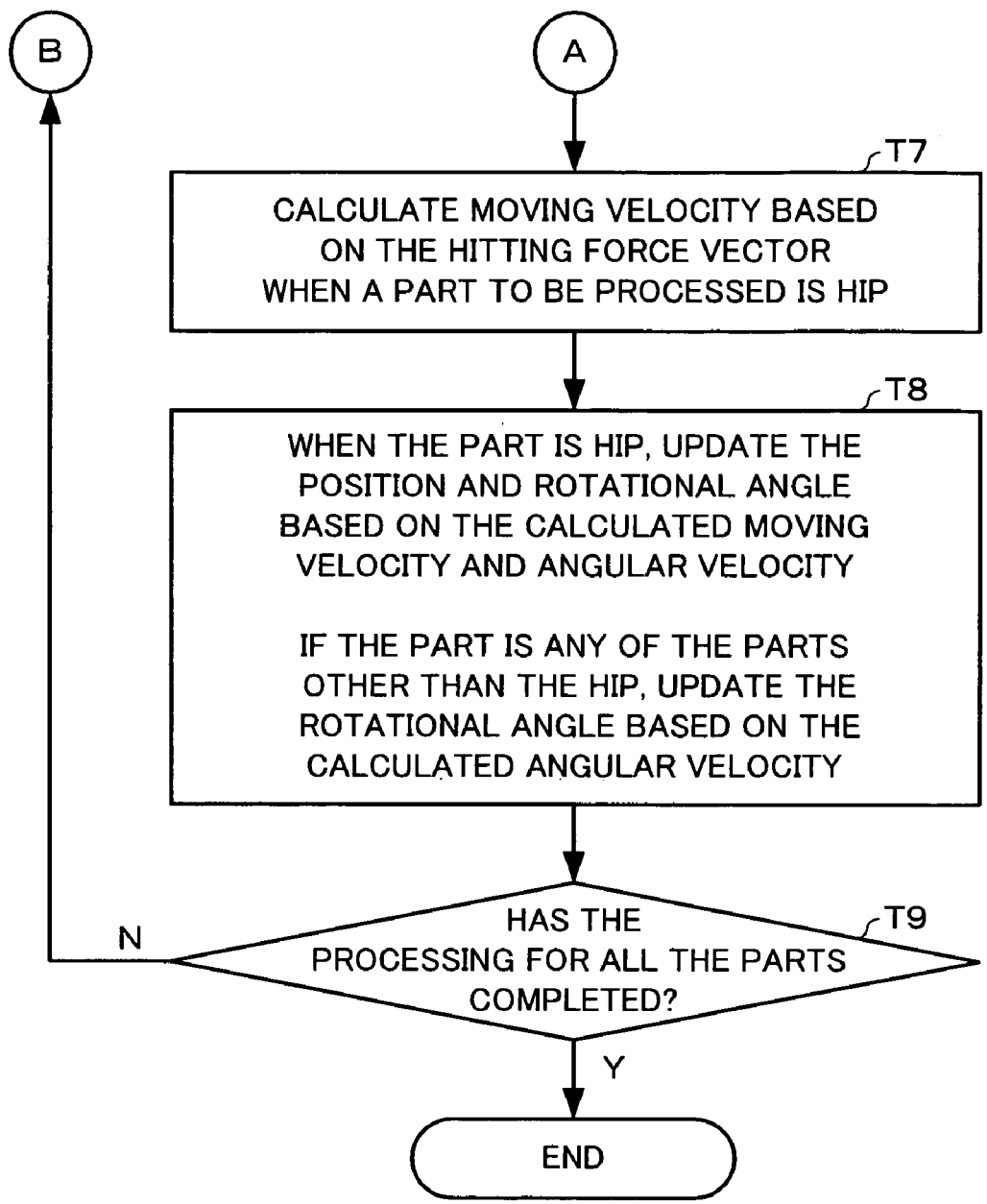
FIG. 14 is a flowchart illustrating the details of still another process according to the present invention.

FIGS. 13 and 14 are flowcharts relating to the generation of motion on hitting.

It is first judged whether or not a part to be processed is one which was hit or to which a vector of hitting force was transmitted (step T1). If that part does not correspond to any of the two aforementioned parts, the procedure shifts to step T5. If the part corresponds to one of two aforementioned parts, the hitting position and the vector of hitting force at that part are obtained (step T2), as described in connection with FIG. 4. The judgment at the step T1 will be carried out based on a hit flag which is set "on" if the part was hit or received the vector of hitting force.

As described in connection with FIG. 7A, the vector of hitting force is transmitted to the parent part while attenuating (damping) its magnitude (step T3). The part to which the vector of hitting force was transmitted has its hit flag set ON.

The rotation moment is then calculated based on the vector of hitting force. The rotation moment is then used to calculate the angular velocity at that part (step T4). For example, at the Nth part of FIG. 7A, the rotation moment LN×FHN may be calculated and used to calculate the angular velocity in the Nth part.

As described in connection with FIG. 7B, the rotational resistance which is proportional to the angular velocity of the part is then calculated. The rotational resistance is used to change the angular velocity of the part (step T5). As described in connection with FIG. 8, the restoring force for returning the enemy character back to its default posture is then calculated and used to change the angular velocity of the part (step T6).

If a part to be processed is the hip of the enemy character, the velocity of the moving hip is calculated based on the vector of hitting force (step T7). For example, in FIG. 4, the moving velocity of the hip 20 may be calculated based on FH4.

If the part to be processed is the hip of the enemy character, the position and rotational velocity thereof are updated based on the calculated moving velocity and angular velocity. If the part to be processed is one other than the hip, its rotational angle is updated based on the calculated angular velocity (step T8). In other words, the position and rotational angle at each of the part in the frame in question are determined.

Finally, it is judged whether or not the procedure for all the parts has completed (step T9). If not so, the procedure returns to the step T1.

4. Hardware Arrangement

Figure 15:
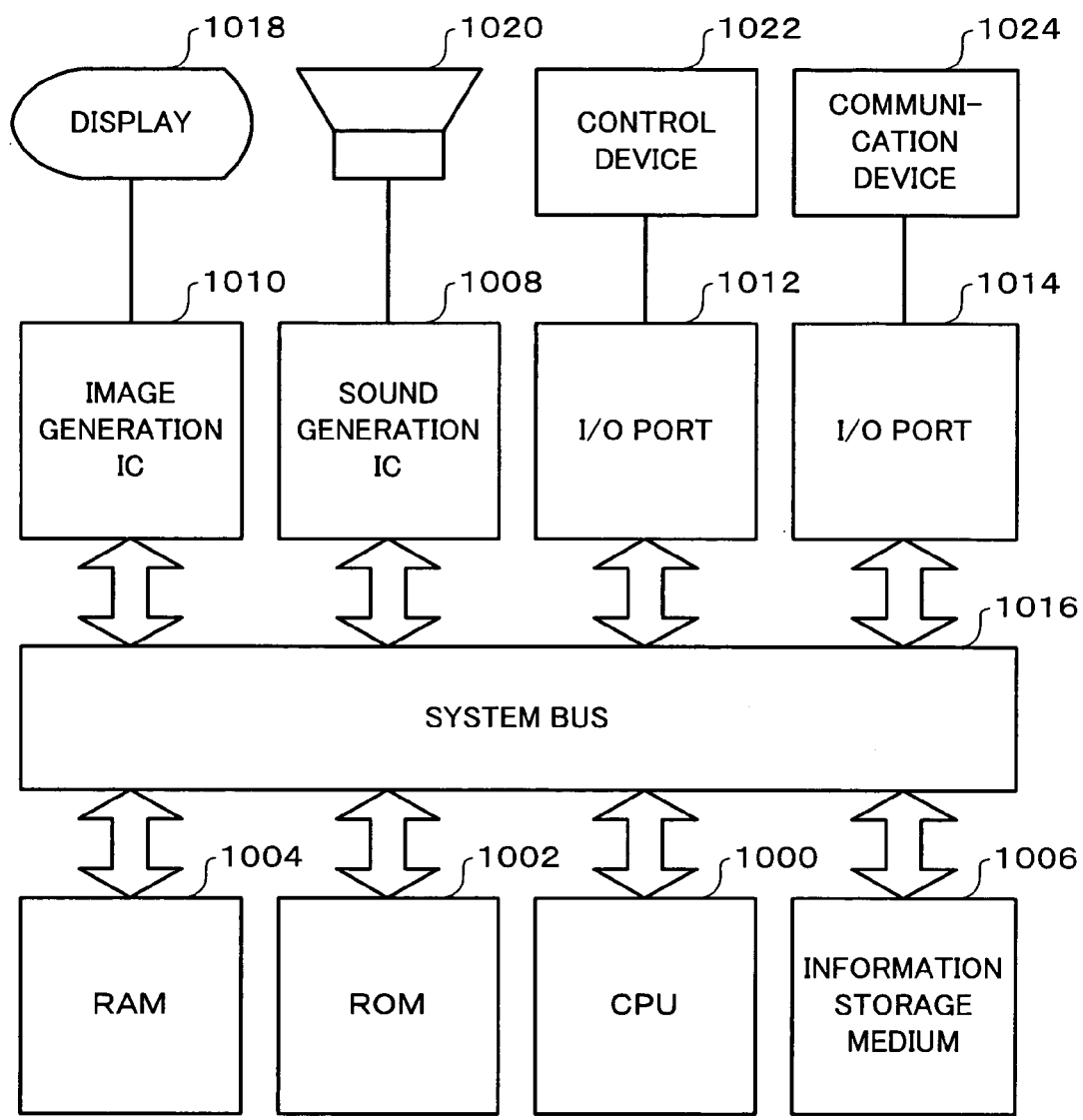
FIG. 15 illustrates a structure of hardware which can realize the present invention.

One hardware arrangement capable of realizing this embodiment will now be described with reference to FIG. 15. The system shown in FIG. 15 comprises CPU 1000, ROM 1002, RAM 1004, an information storage medium 1006, a sound generation IC 1008, an image generation IC 1010 and I/O ports 1012, 1014, all of which are interconnected through a system bus 1016 for data reception and transmission. The image generation IC 1010 is connected to a display 1018; the sound generation IC 1008 to a speaker 1020; the I/O port 1012 to a control device 1022; and the I/O port 1014 to a communication device 1024.

The information storage medium 1006 has mainly stored a program, image data for representing objects, sound data and others. For example, a home game apparatus may use DVD, game cassette, CD-ROM or the like as an information storage medium for storing the game program and other data. An arcade game apparatus may use a memory such as ROM or the like. In the latter case, the information storage medium 1006 is in the form of ROM 1002.

The control device 1022 corresponds to a game controller, control panel or the like. The control device 1022 is used by the player for inputting his or her judgment into the game system according to the progress of game.

CPU 1000 is to perform the control of the entire game system and the processing of various data according to the program stored in the information storage medium 1006, the system program (such as information for initializing the entire system) stored in the ROM 1002, input signals from the control device 1022 and soon. RAM 1004 is a memory means used as a working area for the CPU 1000 and has stored given contents in the information storage medium 1006 and ROM 1002 or the results of computation in the CPU 1000. The structures of data having a logical structure for realizing this embodiment may be build on this RAM or information storage medium.

The sound and image generation IC's 1008, 1010 in this game system are to output game sounds and images in a preferred manner. The sound generation IC 1008 is in the form of an integrated circuit for generating game sounds such as sound effects, background music and others, based on the information stored in the information storage medium 1006 and ROM 1002, the generated sounds being then outputted through the speaker 1020. The image generation IC 1010 is in the form of an integrated circuit which can generate pixel information to be outputted toward the display 1018 based on the image information from the RAM 1004, ROM 1002, information storage medium 1006 and so on. The display 1018 may be in the form of a so-called head mount display (HMD).

The communication device 1024 is to receive and transmit various pieces of information which are utilized in the game apparatus from and to external. The communication device 1024 is connected to the other game system (or systems) to transmit and receive given information corresponding to the game program from and to the other game systems or utilized to transmit and receive the information including the game program and other data through the communication line.

Various processing steps previously described in connection with FIGS. 1 to 14 are realized by the information storage medium 1006 stored the information such as program, data and so on, and CPU 1000, image generation IC 1010 and sound generation IC 1008 which operate based on the information from the information storage medium 1006. The processings in the image generation IC 1010 and sound generation IC 1008 may be performed in a software manner through the CPU 1000 or all-purpose DSP.

When this embodiment is applied to such an arcade game system as shown in FIG. 1, a system board (or circuit board) 1106 included in the game system comprises CPU, image generation IC, sound generation IC and others all of which are mounted therein. The system board 1106 includes an information storage medium or semiconductor memory 1108 which has stored information for executing (or realizing) the processings of this embodiment (or means of the present invention). These pieces of information will be referred to "the stored information pieces".

Figure 16A:
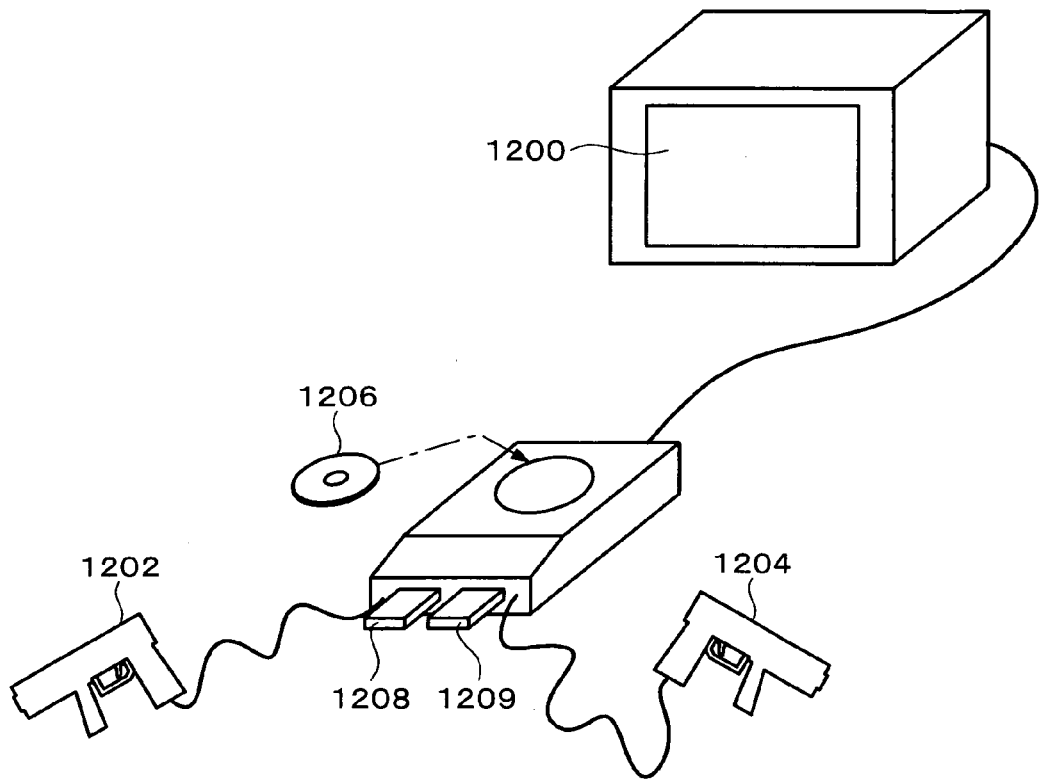
FIGS. 16A and 16B illustrate various possible forms of the system according to the present invention.

FIG. 16A shows a home game apparatus to which this embodiment is applied. A player enjoys a game by manipulating game controllers 1202 and 1204 while viewing a game picture displayed on a display 1200. In such a case, the aforementioned stored information pieces have been stored in DVD 1206 and memory cards 1208, 1209 which are detachable information storage media in the game system body.

Figure 16B:
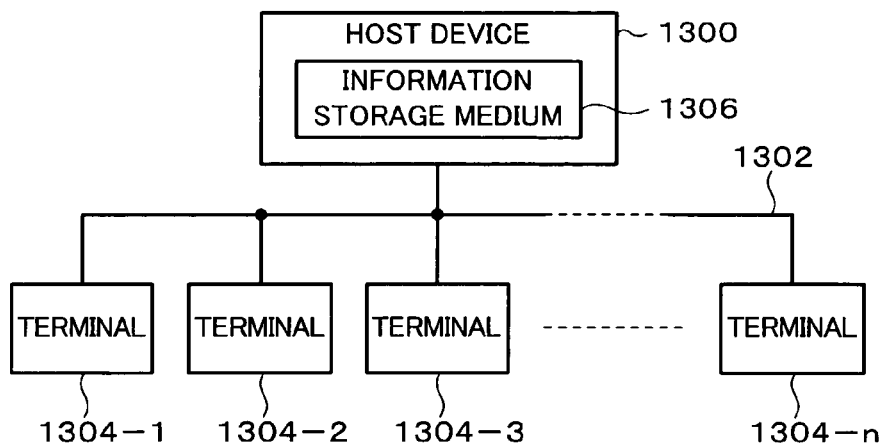

FIG. 16B shows an example wherein this embodiment is applied to a game system which includes a host device 1300 and terminals 1304-1 to 1304-n connected to the host device 1300 through a communication line (which is a small-scale network such as LAN or a global network such as INTERNET) 1302. In such a case, the above stored information pieces have been stored in an information storage medium 1306 such as magnetic disk device, magnetic tape device, semiconductor memory or the like which can be controlled by the host device 1300, for example. If the terminals 1304-1 to 1304-n are designed each to have a CPU, image generation IC and sound processing IC and to generate game images and game sounds in a stand-alone manner, the host device 1300 delivers game program and other data for generating game images and game sounds to the terminals 1304-1 to 1304-n. On the other hand, if the game images and sounds cannot be generated by the terminals in the stand-alone manner, the host device 1300 will generate the game images and sounds which are in turn transmitted to the terminals 1304-1 to 1304-n.

In the arrangement of FIG. 16B, the processings of the present invention may be decentralized into the host device (or server) and terminals. The above information pieces for realizing the present invention may be distributed and stored into the information storage media of the host device (or server) and terminals.

Each of the terminals connected to the communication line may be either of home or arcade type. When the arcade game systems are connected to the communication line, it is desirable that each of the arcade game systems includes a portable information storage device (memory card or portable game machine) which can not only transmit the information between the arcade game systems but also transmit the information between the arcade game systems and the home game systems.

The present invention is not limited to the things described in connection with the above embodiment, but may be carried out in any of various other forms.

For example, the invention as defined in any depending claim may include only part of the components in any independent claim to which the depending claim belongs. The essential components in any independent claim of the present invention may be included in any other independent claim.

Although the technique of physical simulation for moving the parts is desirably in such a form as described in connection with FIG. 4, the present invention is not limited to such a form, but may be carried out in any of various modifications. Although it is desirable that the hit information is in the form of a vector of hitting force for simplifying the procedure, the present invention is not limited to such a form, but may be suffice to move at least the parts.

Although this embodiment has been described mainly as to the play and generation of motion for the enemy character, the object to be generated or played in motion is not limited to the enemy character, but may take any of various other objects such as player's character or moving body.

Although this embodiment has been described as to the object hit by the shots, the object may be hit by a sword, conk or kick.

The switching between the generation of motion and the play of motion is not limited to such a technique as described in connection with FIG. 4 or other figures, but may include a component of any physical simulation (or pseudo-physical simulation). The event of switching between the generation of motion and the play of motion is not limited to such events (e.g., hitting of the object) as described in this embodiment, but may be any of various other events.

Other than the gun-type game, the present invention may similarly be applied to any of various other games such as other shooting games, fighting games, robot combat games, sports games, competitive games, roll-playing games, music playing games, dancing games and so on.

Furthermore, the present invention can be applied to various image generation systems such as arcade game systems, home game systems, large-scaled multi-player attraction systems, simulators, multimedia terminals, image generation systems, game image generation system boards and so on.

The invention claimed is:

1. An image generation system for generating an image of a three-dimensional object formed by a plurality of parts visible from a given viewpoint within a three-dimensional object space, comprising:
a memory which stores a program and data for image generating; and
at least one processor which is connected to the memory and performs processing for image generating,
the processor performing:
playing a motion of the three-dimensional object formed by a plurality of parts based on pre-stored motion data;
generating the motion of the three-dimensional object through a physical simulation;
switching processing from a play of the object's motion based on the pre-stored motion data to a generation of the object's motion through a physical simulation when the object is hit; and
generating a connecting motion based on interpolation of the motion generated by the physical simulation and the motion played based on the pre-stored motion data, the connecting motion connecting the motion played based on the pre-stored motion data with the motion generated by the physical simulation.

2. The image generation system according to claim 1, wherein processing for generating the motion of the object through a physical simulation generates a motion of the object formed by a plurality of parts, by moving an Nth part through a physical simulation based on hit information when the Nth part is hit and sequentially transmitting the hit information to the N+1th, N+2th, N+3th . . . parts so that the N+1th, the N+2th, the N+3th . . . parts are sequentially moved through a physical simulation based on the transmitted hit information.

3. The image generation system according to claim 2, wherein the hit information is a force vector in the direction of hitting, and
each of the parts is moved through a rotation moment obtained by the force vector.

4. The image generation system according to claim 3, wherein the magnitude of the force vector is sequentially attenuated while the force vector is transmitted to each of the parts.

5. The image generation system according to claim 2, wherein a rotational resistance force is acted on each of the parts depending on the angular velocity of each of the parts.

6. The image generation system according to claim 2, wherein a restoring force for returning an object back to a given posture is acted on each of the parts.

7. An image generation system for generating an image of a three-dimensional object formed by a plurality of parts visible from a given viewpoint within a three-dimensional object space, comprising:
a memory which stores a program and data for image generating; and
at least one processor which is connected to the memory and performs processing for image generating,
the processor performing:
playing a motion of the three-dimensional object formed by a plurality of parts based on pre-stored motion data;
generating the motion of the three-dimensional object through a physical simulation;
switching processing from a generation of the object's motion through a physical simulation to a play of the object's motion based on the pre-stored motion data when a given condition is satisfied; and
generating a connecting motion based on interpolation of the motion generated by the physical simulation and the motion played based on the pre-stored motion data the connecting motion connecting the motion generated by the physical simulation with the motion played based on the pre-stored motion data.

8. The image generation system according to claim 7, the processor further performing:
switching processing from the generation of the object's motion through the physical simulation to the play of the object's motion based on the pre-stored motion data, in at least one of cases where a given time period has elapsed after the object has been hit and where a parameter relating to the object reaches a given value.

9. A computer-usable program for generating an image of a three-dimensional object formed by a plurality of parts visible from a given viewpoint within a three-dimensional object space, the program embodied in an information storage medium or a carrier wave, comprising a processing routine for realizing:
playing a motion of the three-dimensional object formed by a plurality of parts based on pre-stored motion data;
generating the motion of the three-dimensional object through a physical simulation;
switching processing from a play of the object's motion based on the pre-stored motion data to a generation of the object's motion through a physical simulation when the object is hit; and
generating a connecting motion based on interpolation of the motion generated by the physical simulation and the motion played based on the pre-stored motion data, the connecting motion connecting the motion played based on the pre-stored motion data with the motion generated by the physical simulation.

10. A computer-usable program for generating an image of a three-dimensional object formed by a plurality of parts visible from a given viewpoint within a three-dimensional object space, the program embodied in an information storage medium or a carrier wave, comprising a processing routine for realizing:
playing a motion of the three-dimensional object formed by a plurality of parts based on pre-stored motion data;
generating the motion of the three-dimensional object through a physical simulation;
switching processing from a generation of the object's motion through a physical simulation to a play of the object's motion based on the pre-stored motion data when a given condition is satisfied; and
generating a connecting motion from interpolation of the motion generated by the physical simulation and the motion played based on the pre-stored motion data the connecting motion connecting the motion generated by the physical simulation with the motion played based on the pre-stored motion data.

11. The program according to claim 10, wherein processing for generating the motion of the object through a physical simulation generates a motion of the object formed by a plurality of parts, by moving an Nth part through a physical simulation based on hit information when the Nth part is hit and sequentially transmitting the hit information to the N+1th, N+2th, N+3th . . . parts so that the N+1th, the N+2th, the N+3th . . . parts are sequentially moved through a physical simulation based on the transmitted hit information.

12. The program according to claim 11, wherein the hit information is a force vector in the direction of hitting, and the program comprising a processing routine each of the parts through a rotation moment obtained by the force vector.

13. The program according to claim 12, the program comprising a processing routine for realizing:
sequentially attenuating the magnitude of the force vector while the force vector is transmitted to each of the parts.

14. The program according to claim 11, the program comprising a processing routine for realizing:
acting rotational resistance force on each of the parts depending on the angular velocity of each of the parts.

15. The program according to claim 11, the program comprising a processing routine for realizing:
acting a restoring force for returning an object back to a given posture on each of the parts.

16. The program according to claim 10, the program comprising a processing routine for realizing:
switching processing from the generation of the object's motion through the physical simulation to the play of the object's motion based on the pre-stored motion data, in at least one of cases where a given time period has elapsed after the object has been hit and where a parameter relating to the object reaches a given value.

17. An image generation method for generating an image of a three-dimensional object formed by a plurality of parts visible from a given viewpoint within a three-dimensional object space, comprising:
playing a motion of the three-dimensional object formed by a plurality of parts based on pre-stored motion data;
generating the motion of the three-dimensional object through a physical simulation;
switching processing from a play of the object's motion based on the pre-stored motion data to a generation of the object's motion through a physical simulation when the object is hit; and
generating a connecting motion based on interpolation of the motion generated by the physical simulation and the motion played based on the pre-stored motion data, the connecting motion connecting the motion played based on the pre-stored motion data with the motion generated by the physical simulation.

18. The image generation method according to claim 17, wherein processing for generating the motion of the object through a physical simulation generates a motion of the object formed by a plurality of parts, by moving an Nth part through a physical simulation based on hit information when the Nth part is hit and sequentially transmitting the hit information to the N+1th, N+2th, N+3th . . . parts so that the N+1th, the N+2th, the N+3th . . . parts are sequentially moved through a physical simulation based on the transmitted hit information; the processing generates an image including an image of the object on which the motion is generated.

19. The image generation method according to claim 18, wherein the hit information is a force vector in the direction of hitting,
the method further comprising:
moving each of the parts through a rotation moment obtained by the force vector.

20. The image generation method according to claim 19, further comprising:
sequentially attenuating the magnitude of the force vector while the force vector is transmitted to each of the parts.

21. The image generation method according to claim 18, further comprising:
acting a rotational resistance force on each of the parts depending on the angular velocity of each of the parts.

22. The image generation method according to claim 18, further comprising:
acting a restoring force for returning an object back to a given posture on each of the parts.

23. An image generation method for generating an image of a three-dimensional object formed by a plurality of parts visible from a given viewpoint within a three-dimensional object space, comprising:
playing a motion of the three-dimensional object formed by a plurality of parts based on pre-stored motion data;
generating the motion of the three-dimensional object through a physical simulation;
switching processing from a generation of the object's motion through a physical simulation to a play of the object's motion based on the pre-stored motion data when a given condition is satisfied; and
generating a connecting motion based on interpolation of the motion generated by the physical simulation and the motion played based on the pre-stored motion data the connecting motion connecting the motion generated by the physical simulation with the motion played based on the pre-stored motion data.

24. The image generation method according to claim 23, further comprising:
switching processing from the generation of the object's motion through the physical simulation to the play of the object's motion based on the pre-stored motion data, in at least one of cases where a given time period has elapsed after the object has been hit and where a parameter relating to the object reaches a given value.

* * * * *